(12) United States Patent  
Barrett

(10) Patent No.: US 9,416,802 B2  
(45) Date of Patent: Aug. 16, 2016

(54) RADAR ENERGY ABSORBING DEFORMABLE LOW DRAG VORTEX GENERATOR

(71) Applicant: University of Kansas, Lawrence, KS (US)

(72) Inventor: Ronald M. Barrett, Lawrence, KS (US)

(73) Assignee: University of Kansas, Lawrence, KS (US)

( * ) Notice: Subject to any disclaimer, the term of this patent is extended or adjusted under 35 U.S.C. 154(b) by 409 days.

(21) Appl. No.: 14/144,526

(22) Filed: Dec. 30, 2013

(65) Prior Publication Data

US 2015/0329200 A1    Nov. 19, 2015

Related U.S. Application Data

(60) Provisional application No. 61/747,888, filed on Dec. 31, 2012.

(51) Int. Cl.
*B64C 23/06* (2006.01)
*F15D 1/00* (2006.01)
*B64C 21/02* (2006.01)
*H01Q 17/00* (2006.01)

(52) U.S. Cl.
CPC ............... *F15D 1/004* (2013.01); *B64C 21/02* (2013.01); *B64C 23/06* (2013.01); *F15D 1/003* (2013.01); *H01Q 17/004* (2013.01); *H01Q 17/008* (2013.01)

(58) Field of Classification Search
CPC ........ B64C 21/10; B64C 21/00; B64C 23/06; B64C 23/065; F15D 1/0035; F15D 1/004; F15D 1/003; H01Q 17/008
See application file for complete search history.

(56) References Cited

U.S. PATENT DOCUMENTS

| | | |
|---|---|---|
| 1,994,045 A | 3/1935 | Nelson |
| 2,163,655 A | 6/1939 | Zimmerman |
| 2,270,314 A | 1/1942 | Kraus |

(Continued)

OTHER PUBLICATIONS

Pletschacher—"Lufthansa Junkers Ju 52 Die Geschichte der alten Tante Ju," Deutsch Aviatic Verlag GmbH, Oberhaching, Germany 2002, ISBN-10: 3925505296, ISBN-13: 9783925505294; p. 22.

(Continued)

*Primary Examiner* — Brian M O'Hara
(74) *Attorney, Agent, or Firm* — Mark E. Stallion, Esq.; Husch Blackwell LLP

(57) ABSTRACT

A family of Radar energy Absorbing Deformable Low Drag Vortex Generators (RAD-LDVG) is described herein. This family of devices are fabricated in such a way that it can conform to aircraft surface features while reducing radar returns from structural details. Vortex generators (VGs) are typically used to reattach or smooth gross flowfields over aircraft surfaces. By doing so, an airfoil or wing can maintain attached flow at higher angles of attack and/or higher lift coefficients than one without the VGs. These devices are also used to reattach and/or smooth flows that encounter cross-flow-induced instabilities and/or adverse pressure gradients on the upper surfaces of wings or near aircraft boattails. Other uses include reduction of buffet, vibration, flutter, cavity resonance or general bluff-body pressure drag reduction. Although conventional rigid VGs do generate vortical aerodynamic structures, two major problems are often experienced: i.) the inability to conform to curved surfaces, ii.) the generation of radar cross-section spikes produced by the VGs themselves.

28 Claims, 10 Drawing Sheets

(56) References Cited

U.S. PATENT DOCUMENTS

| | | | |
|---|---|---|---|
| 2,532,753 | A | 12/1950 | Beman |
| 2,800,291 | A | 7/1957 | Stephens |
| 3,072,368 | A | 1/1963 | Seddon et al. |
| 3,525,486 | A | 8/1970 | Wimpenny |
| 3,578,264 | A | 5/1971 | Kuethe |
| 3,672,718 | A | 6/1972 | Broyer |
| 4,039,161 | A | 8/1977 | Bauer et al. |
| 4,320,919 | A | 3/1982 | Butler |
| 4,343,506 | A | 8/1982 | Saltzman |
| 4,455,045 | A | 6/1984 | Wheeler et al. |
| 4,655,419 | A | 4/1987 | Van Der Hoeven et al. |
| 5,058,837 | A | 10/1991 | Wheeler et al. |
| 5,209,438 | A | 5/1993 | Wygnanski |
| 5,253,828 | A | 10/1993 | Cox et al. |
| 5,755,408 | A | 5/1998 | Schmidt et al. |
| 6,105,904 | A | 8/2000 | Lisy et al. |
| 6,427,948 | B1 | 8/2002 | Campbell |
| 7,878,457 | B2 | 2/2011 | Narramore |
| 7,900,871 | B2 * | 3/2011 | Rincker ............... B64C 23/06 244/134 A |
| 8,413,928 | B2 * | 4/2013 | Rawlings ............... B64C 21/10 244/130 |
| 2005/0230565 | A1 | 10/2005 | Kallinen |
| 2011/0008174 | A1 * | 1/2011 | Ireland ............... B64C 23/06 416/223 R |
| 2011/0315248 | A1 * | 12/2011 | Simpson ............... F15D 1/003 137/561 R |

OTHER PUBLICATIONS

Mankau—"Messerschmitt Bf 110, Me 210, Me 410. Die Messerschmitt-ZerstOrer and ihre Konkurrenten." Aviatic Verlag GmbH, Oberhaching, Germany 2001, ISBN 3-925505-62-8; p. 18.

Winchester—BelThe Aviation Factfile Concept Aircraft: Prototypes, X-Planes and Experimental Aircraft, Grange Books Plc., Kent, UK, 2005. ISBN 978-1-59223-480-6; p. 33.

* cited by examiner

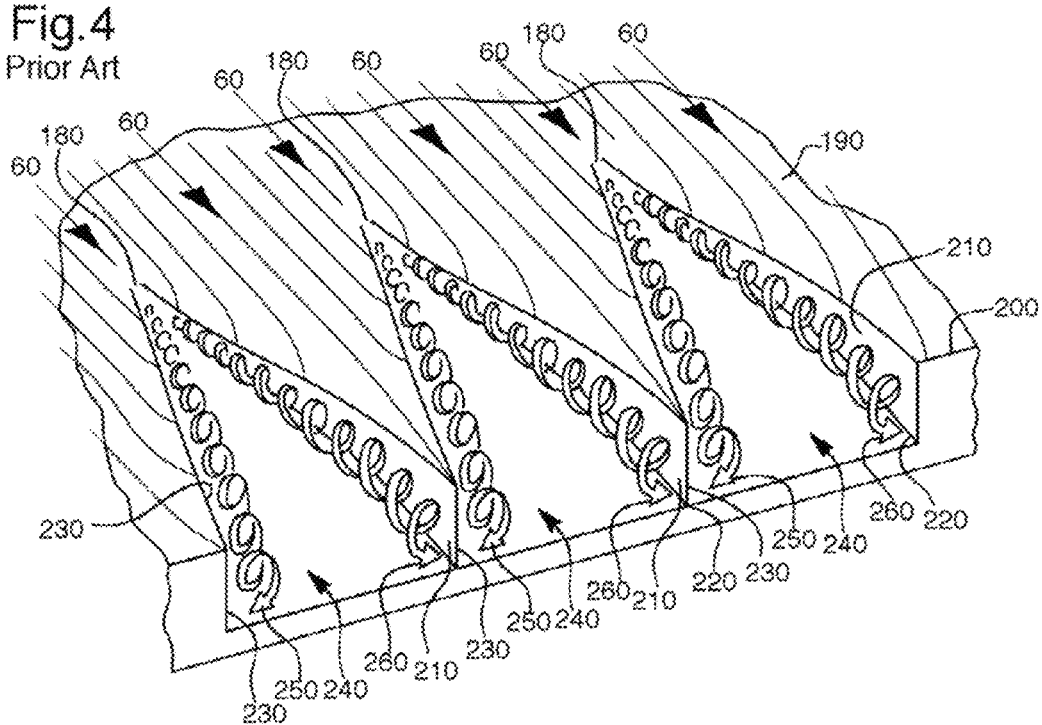
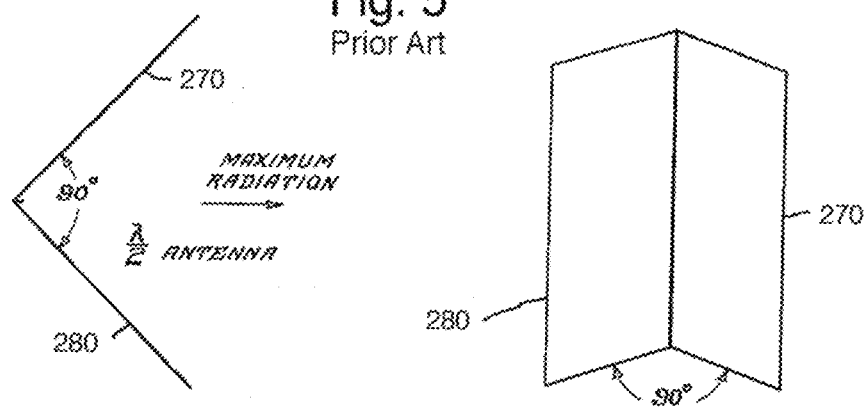

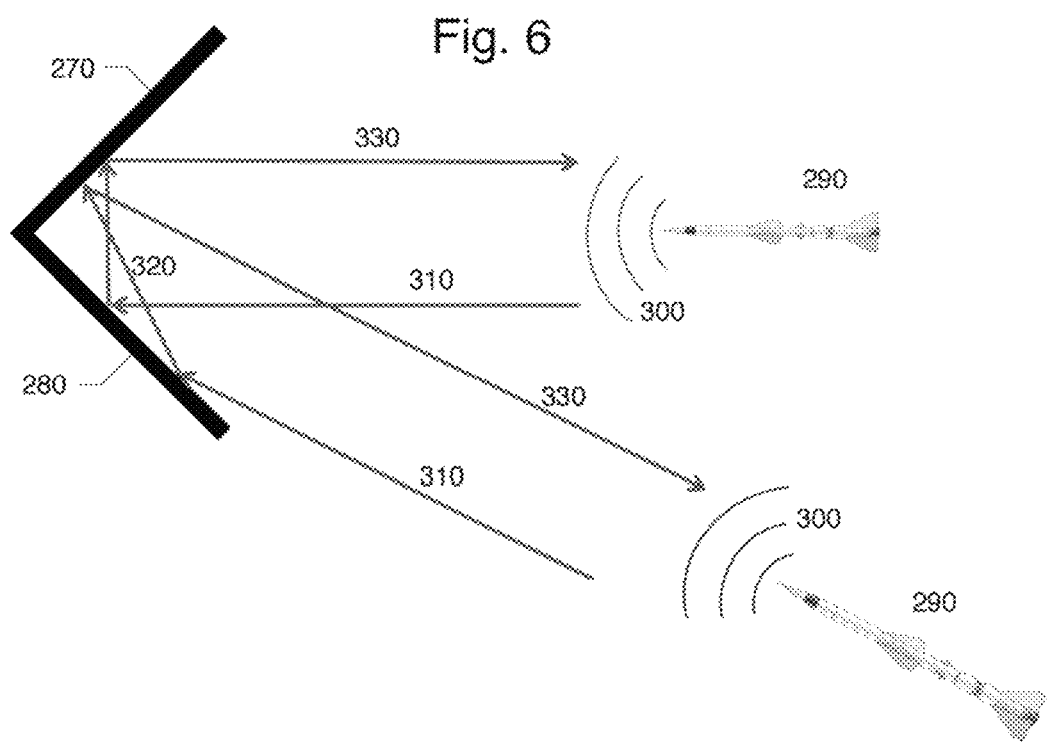

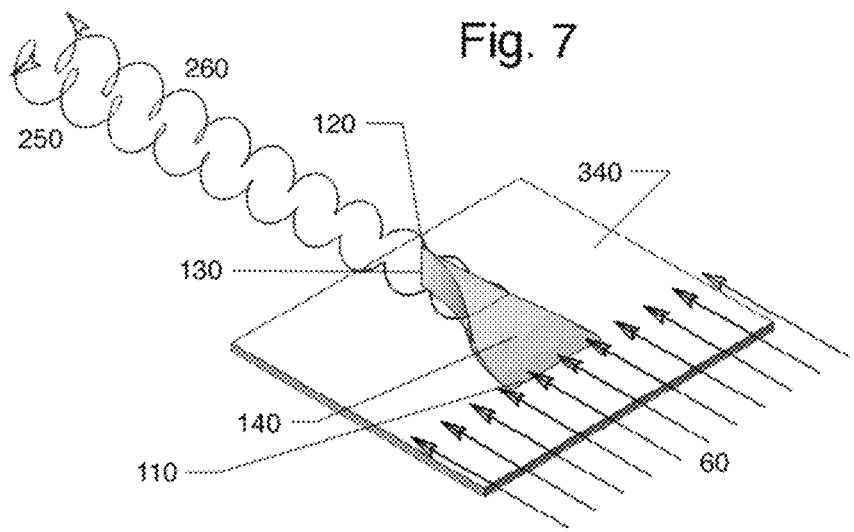
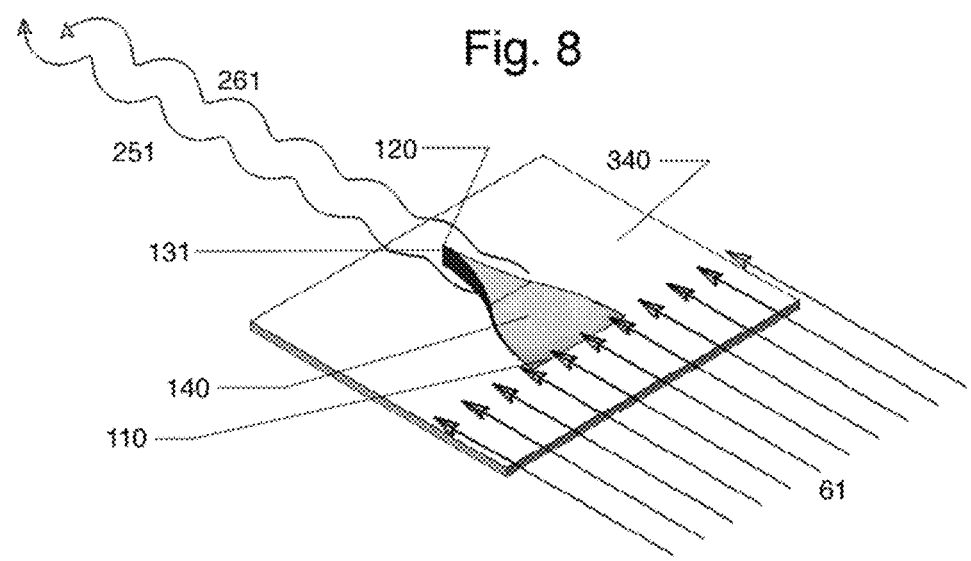
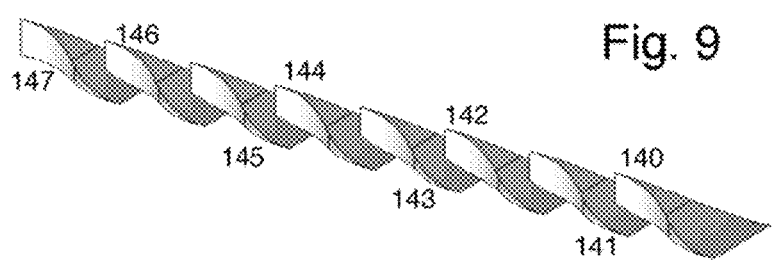

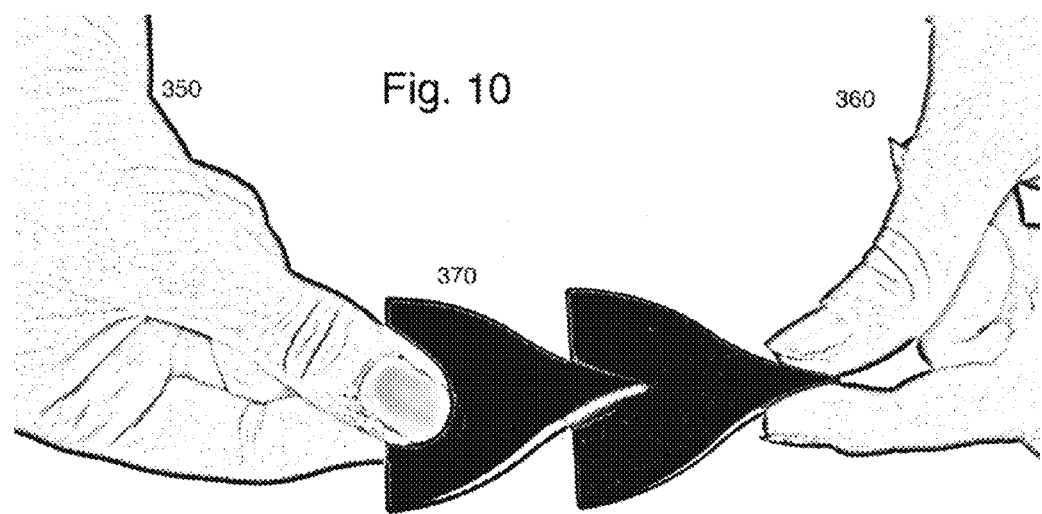
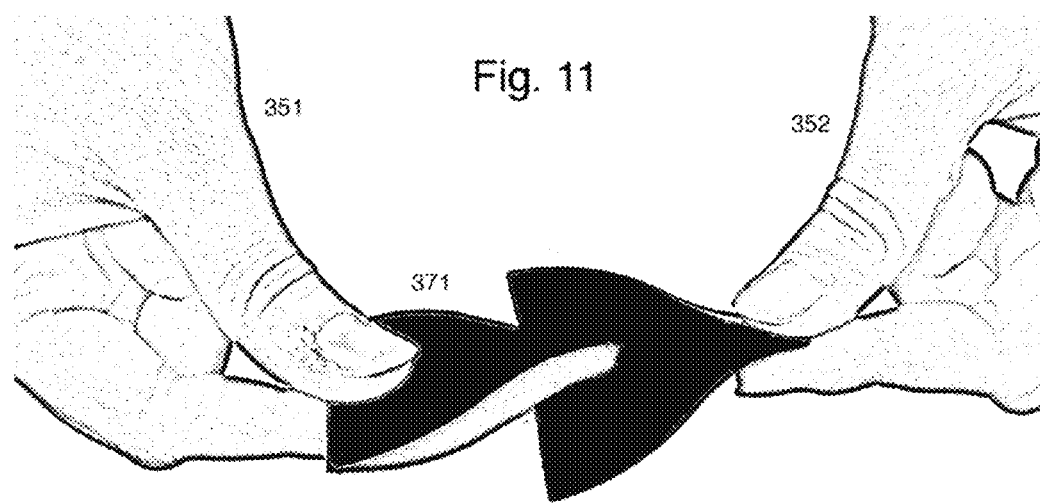

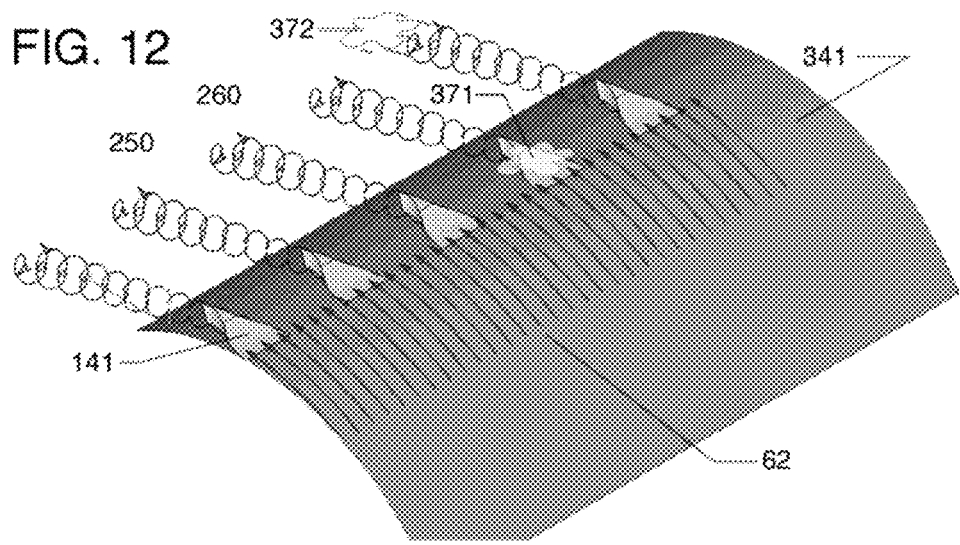

Fig. 16
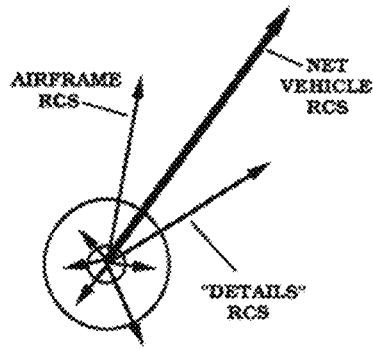
Poorly Integrated Design
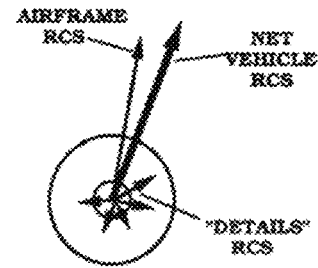
Well Integrated Design

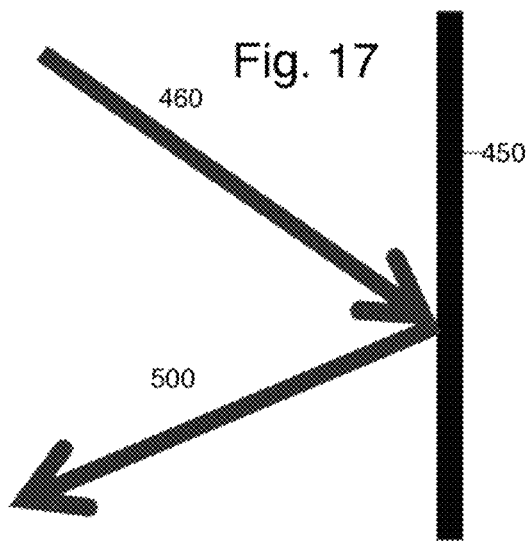
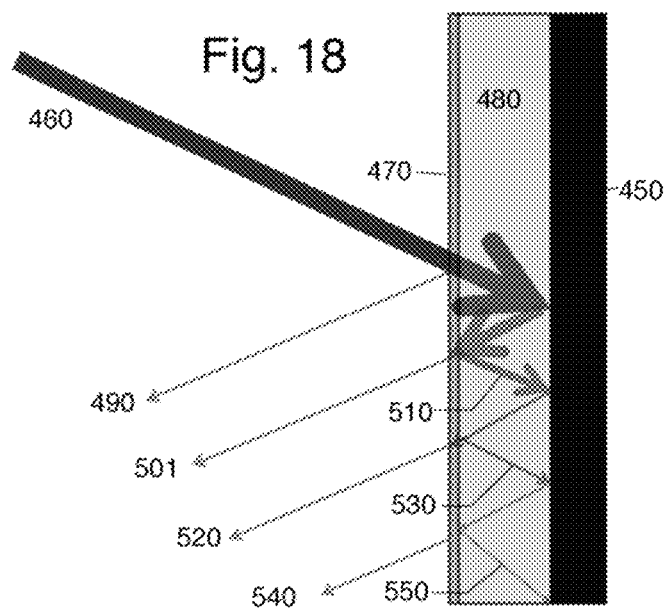

RADAR ENERGY ABSORBING DEFORMABLE LOW DRAG VORTEX GENERATOR

CROSS REFERENCE

This application claims priority to and the benefit of U.S. Provisional Patent Application Ser. No. 61/747,888 entitled, RADAR ABSORBING DEFORMABLE LOW DRAG VORTEX GENERATOR, filed Dec. 31, 2012, which is incorporated by reference herein in its entirety.

BACKGROUND OF THE INVENTION

Field The Radar energy Absorbing Low Drag Vortex Generator (RAD-LDVG) relates to a class of devices which produce vortices over external or internal aerodynamic and/or hydrodynamic surfaces.

Background Art Vortex generators (VGs) come in a wide variety of shapes and sizes, but are used to increase maximum lift coefficients, and/or reattach flows which would separate, and/or smooth unstable flows over lifting surfaces, stabilizers, high lift devices or flight control mechanisms. Some of the first mentions of devices which were intentionally designed to produce aerodynamic vortices were described in the 1930's. U.S. Pat. No. 1,994,045 describes an aircraft with a plurality of ridges in streamwise, spanwise and crosswise directions on wings and aerodynamic lifting surfaces. In normal flight, these forms of ridges set up Görtler vortices which will tend to keep flows attached at the expense of increased overall drag. These same structures were conceived in the Junkers design bureau of Germany in the late 1920's and implemented on a commercial scale on the Ju-52 of 1932. Pletschacher (2002) describes the corrugated Duraluminum skin which added to the comparative structural rigidity of the aircraft with respect to wood and canvas aircraft of the day. Although those early vortex-generating skins performed well in terms of flow attachment, high drag was a hallmark of the design. Accordingly, in 1936, as other design bureaus in Germany experimented with wing skins, it was found that smooth skins had significantly lower drag levels and were therefore preferred for most aircraft flight phases. As the Bayerische Flugzeugwerke Messerschmitt began flight testing of the Bf-110 "Zerstörer," they discovered many aerodynamics challenges as reported by Mankau and Petrick, (2001). To solve some of these issues on the V1 version of the Bf-110 aircraft, several rows of rigid vortex-generating structures were installed on the upper surfaces of the wings. This is often recognized as the first application of separate, independent, replaceable VGs on an aircraft of any class. Although quite effective in delaying flow separation, they possessed one characteristic which would prove fatal in combat in later years: They generated radar cross-section spikes. Because they formed "corner" or "retro" reflectors, they had the tendency to return radar energy to the direction of the transmitting radar. Accordingly, modern stealth aircraft never employ VGs because of the large radar return echoes.

Following this first appearance of VGs, they were reproduced, altered and reapplied analytically, conceptually and experimentally. U.S. Pat. No. 2,163,655 shows an early attempt in the US to manipulate the effects of wingtip vortices via the application of diagonal flow slots cut from the pressure surface to the suction surface of the airfoil. Although the feature could indeed manage wingtip vortex strength, it did little to generate streamwise subscale vortical structures which are so critical in maintenance of attached flow, as had been proven by the Bayerische Flugzeugwerke Messerschmitt in 1936.

As aircraft flight speeds continued to push into the transonic regime, shock-induced separation became pronounced and often lead to flight control surface and flight path departure. To mitigate these effects, rigid structures like those presented in U.S. Pat. No. 2,532,753 were used. As with the Bf-109 VGs 20 years earlier, these, too possessed retro-reflector corners which would spike radar cross-section (RCS). Still, the Bell X-1B was one of the first aircraft to use separate, rigid VGs of this configuration to mitigate adverse transonic flow effects just ahead of the ailerons as shown by Winchester (2005).

Although radio frequency (RF) antenna designs are typically divorced from aerodynamic considerations, U.S. Pat. No. 2,270,314 shows a design for a "Corner Reflector Antenna" which is nearly identical to a conventional vane vortex generator. Clearly U.S. Pat. No. 2,270,314 teaches a device which is made from a single sheet of conductive material bent at 90° and roughly rectangular in form. Most of the myriad of vortex generators cited herein have features like this. Because a corner reflector or "retroreflector" can return radio frequency waves to the source, it is often used in surface objects like buoys and airborne targets of various classes because it makes them easy to track via a greatly increased radar cross section. Of course, if such structures are placed on the surface of an aircraft which is a typical application taught in nearly all of the VG references herein, the RCS of the aircraft employing such VGs will in turn be increased.

The rigid geometric shapes described in U.S. Pat. No. 2,800,291 which possesses retroreflector corner shapes, were used in the Bell X-1B. In spite of retro-reflector right angles, this marked the first time that rigid vortex generators of the wedge-ramp configuration were described in the patent literature. U.S. Pat. No. 3,072,368 describes more application of the rigid wedge-ramp configuration including flow reattachment on aircraft boattail structures and in the region of transonic shock pods on lifting surfaces. As with all preceding VG configurations described in the patent literature, they possess right angles and are rigid, and therefore very adversely impact total aircraft RCS.

Although the rigid ramp structures of U.S. Pat. No. 3,072,368 would clearly be effective in generating streamwise vortical structures, their consistent presence would incrementally induce drag during cruise. Again, RCS would be spiked in certain aspects because of the right angle designs taught. U.S. Pat. No. 3,578,264 addresses the issues of high persistent drag by employing rigid VGs which are completely submerged within the outer mold line of the airfoil itself. Accordingly, when they are not needed, they would produce no drag increment. When called upon, air could be actively blown through the wing over the rigid VGs and accordingly, keep the flow attached. Of course, once deployed, these rigid VGs would significantly increase RCS. When stowed, the holes through which they are retracted would possess their own high frequency RCS increments.

U.S. Pat. No. 3,672,718 shows how rigid VGs can be employed at the aft cab of automobiles while U.S. Pat. No. 4,039,161 shows rigid pop-up vortex generators that are used to attach flows over deflecting flight control surfaces. U.S. Pat. No. 4,320,919 shows a rigid VG skirt mounted to the roof of a ground vehicle. Cavity-mounted rigid VGs are shown on a truck in U.S. Pat. No. 4,343,506. U.S. Pat. No. 4,455,045 shows rigid doublet versions of ramp vortex generators on ground vehicles and aerodynamic surfaces. This design clearly works well when it comes to flow attachment, but is challenged with respect to RCS increment when made of radar-reflective materials like almost any form of metal as it teaches retro-reflector features. Further, because it is curvilinear in the vertical projection, its corner-reflector properties have even greater scatter than the designs taught by the conventional vane vortex generators of the Bf-110. If the VG of U.S. Pat. No. 4,455,045 were made of dielectric material, then the problem of radar transparency would reveal all aircraft surface imperfections which lie beneath the VG, also leading to RCS spikes.

U.S. Pat. No. 4,655,419 teaches rigid VGs which are nearly identical to those used by Bayerische Flugzeugwerke Messerschmitt in nearly identical arrangements, but on aircraft that fly on the lower edge of the transonic flight regime with swept wings. Because all of the aforementioned patents teach configurations which have retro-reflector features, their associated RCS increments will be comparatively large.

The first of the rigid "V" or "Wishbone" VGs are described in U.S. Pat. No. 5,058,837. These VGs function in much the same way as the rigid ramp VGs as a pocket of low energy flow is pushed into the apex of the structures prior to spilling over the lip. When considering steady flow, the gross flowfield structure and resulting vortical structures are nearly identical to those generated by ramp VGs of the same overall geometric dimensions. Again, because the sides are essentially normal to the surface of the aerodynamic structure, they form retro-reflectors and adversely impact RCS.

Another pop-up rigid VG configuration is laid out in U.S. Pat. No. 5,209,438 Like U.S. Pat. No. 4,039,161, these rigid VGs lie within the outer mold line of the aerodynamic surface and are thrust out from the outer mold line when driven by a cam or mechanical device. Just as is the case with the technology taught in U.S. Pat. No. 4,039,161, the RCS increment would be considerable.

This theme continues with U.S. Pat. No. 5,253,828 where the rigid VGs are mounted to the leading edges of control surface extensions in a way that is almost identical to U.S. Pat. No. 4,039,161 except that the VGs protrude through slots rather than holes. As with earlier pop-up VG configurations, the VG designs taught by U.S. Pat. No. 5,253,828 would possess not only high RCS increments when deployed, but their actuating slots and violation of the lifting surface outer mold line would further drive up RCS.

U.S. Pat. No. 5,755,408 shows another variant of retractable, rigid flow disruption devices, but with a mount near the leading edge of the aerodynamic surface rather than at the leading edge of the flight control surface. Another rigid device which can deploy from around the leading edge of an aerodynamic surface for generating vortical flow structures is described in U.S. Pat. No. 6,105,904. Like U.S. Pat. No. 5,755,408 and all of the preceding pop-up vortex generators, the lifting surface out mold line (OML) is violated by the extension-retraction mechanism and/or the VG itself, bringing both structural and RCS challenges.

U.S. Pat. No. 6,427,948 shows the first of the active VGs which is trained to bend in response to command signals. By using bimetallic or shape-memory-alloy (SMA) sheets and/or foils, the conventional vane VG of U.S. Pat. No. 6,427,948 is shown to change in camber. Because the VG is placed approximately normal to the flow, the induced drag of the VG may be manipulated by varying the amount of current flowing through the actuation mechanism. However, it contains no way to alter its height above the surface, angle with respect to the surface and therefore wetted area. Accordingly, only one component of its apparent drag may be reduced. Because of its rigid mount, it is incapable of being shaped to the compound curves present on many aerodynamic surfaces without gross rework, reshaping, or adapter rails or other mechanisms. What is more is that because these forms of VGs must be made from conducting materials like SMA's or bimetallic strips to function and they are charged with electricity, their RCS increments will be extremely large. Further, because low observables are important, their thermal actuation makes them stand out in the infrared spectrum which is directly counter to proper low-observables aircraft design.

U.S. Pat. No. 7,878,457 skirts the problem of OML penetration by employing conventional, rigid vane vortex generators which can be laid flat at a skewed angle to the oncoming flow. By doing so, the structural integrity of the aerodynamic surface is preserved and installation procedures are simplified. However, the complexity and small form factor of a folding mechanism which must fight full flight airloads at an angle which is normal to the surface is challenging. Because the deployed angle shown is "greater than 0° and less than 180°" to the surface, a pocket of low energy air will be found at the base near the actuation mechanism. Accordingly, this form of rigid VG is susceptible to ice accumulation and atmospheric fouling in that area, which can, as a result, freeze it in either the "up" or "down" position. Because these VGs are taught on the leading edge surfaces, conductant creepage will be a significant issue as flight through rain can render leading-edge surface actuators fundamentally ineffective, even with good seals. Because the VGs taught in U.S. Pat. No. 7,878,457 are also electrically actuated, the RCS in several spectra will be increased dramatically via several mechanisms including creeping wave radiation and surface gapping.

U.S. Pat. No. Application 2005/0230565A1 shows a complex system of introducing vortical flow structures over flight control surfaces by using rigid channels, grooves and slots in the trailing edge of a wing structure, just ahead of a high lift mechanism. The complicated nature of this rigid system indicates considerable expense in design, fabrication and installation and occupation of nontrivial amounts of chordwise airfoil volume which decreases fuel storage capacity and therefore aircraft total range.

U.S. Pat. No. Application 2011/0315248A1 describes the first of the rigid VGs to specifically address the issue of radar cross section by specifically claiming it to be compatible with "stealth technologies." The technology taught in this application addresses the issue of RCS return from retro-reflector configurations which is a problem for nearly all previous VG configurations. Although 2011/0315248A1 addresses these concerns by employing oblique reflection techniques, several problems are generated by doing so. The first, as with earlier VG designs taught in nearly all preceding art is that the devices are rigid. Accordingly, they will be challenging to install on curvilinear surfaces which are the norm for most aircraft. Because the VGs are designed to employ oblique reflection techniques, they are necessarily RF reflective. Given that they are also rigid, surface gapping against the aircraft skins will be present. These surface gaps, themselves will present RCS leakage problems. The second RCS issue is that although monostatic radar is challenged by oblique reflection techniques, bistatic and semi-active radar tracking schemes are not. Rather, they rely upon high oblique angle RCS spikes for both general aircraft localization and terminal guidance. Because of the scale necessarily taught by 2011/0315248A1, the wavelength and multiples of the wavelength will be highly compatible with X and K-band radars which are very frequently used in the semi-active radars of surface-to-air and air-to-air guided missiles. Accordingly, a feature which is intended to help mitigate RCS issues will actually exacerbate them when considering modern air combat weapon systems, designs and tactics. The RAD-LDVG skirts all of the aforementioned concerns.

SUMMARY OF THE INVENTION

The Radar energy Absorbing Low Drag Vortex Generator (RAD-LDVG) is specifically designed to: i.) be easy to install on aircraft so as to, ii.) reattach and smooth aerodynamic flows to reduce drag, mitigate vibration, noise and buffet and/or increase maximum aircraft lift capability while, iii.) decreasing the aircraft radar cross section. The RAD-LDVG features are taught in no prior art because the basic material will be able to undergo surface and internal strains in excess of 1% without structural damage to the RAD-LDVG. Within the RAD-LDVG, substructures and radar absorbing materials specifically trap radio-frequency energy via a variety of techniques. The RAD-LDVG comprises a ramp-shape which forces the low energy boundary layer to go up the ramp and spill over a pair of angled sides. As the flow goes over the sides, it is wrapped up into a single or a pair of counter-rotating steamwise vortices. These vortices are the primary mechanism for generation of favorable overall flow properties.

The Radar energy Absorbing Deformable Low Drag Vortex Generators (RAD-LDVG) is further described herein. The devices are fabricated in such a way that it can conform to aircraft surface features while reducing radar returns from structural details. Vortex generators (VGs) are typically used to reattach or smooth gross flowfields over aircraft surfaces. By doing so, an airfoil or wing can maintain attached flow at higher angles of attack and/or higher lift coefficients than one without the VGs. These devices are also used to reattach and/or smooth flows that encounter crossflow-induced instabilities and/or adverse pressure gradients on the upper surfaces of wings or near aircraft boattails. Other uses include reduction of buffet, vibration, flutter, cavity resonance or general bluff-body pressure drag reduction. Although conventional rigid VGs do generate vortical aerodynamic structures, two major problems are often experienced: i.) the inability to conform to curved surfaces, ii.) the generation of radar cross-section spikes produced by the VGs themselves. The RAD-LDVG simultaneously solves these two problems by employing flexible radar energy absorbing materials and specialized radar energy absorbing internal structural arrangements. Because the RAD-LDVGs are flexible, they may conform to the aircraft surface be it flat or imperfect, over features like joints, screw and/or rivet heads.

As the RAD-LDVGs are installed over surface details or excrescences, they mask the radar cross-section increments induced by the details. This masking property reduces the overall radar cross-section of the entire aircraft. The flexibility of the RAD-LDVGs allow for easier installation by methods such as surface bonding than conventional vortex generators as they can be shaped to the surface curvature during installation. This ability to curve and deform accordingly reduces or eliminates the need for specialized machining, adapter rails or adapter blocks. Because the RAD-LDVG is flexible, it will inherently shrink in height as it is exposed to increased dynamic pressure from oncoming airflow at greater flight speeds.

The height reduction will accordingly reduce cruise drag increments produced by the RAD-LDVGs. Conversely, the RAD-LDVGs will inherently grow in height during low dynamic pressure flight phases, which will, in turn, increase vortex generator effectiveness. Because takeoff and landing flight phases are performed at comparatively low dynamic pressures, the RAD-LDVGs will become more effective and produce greater levels of flow attachment, thereby increasing maximum lift coefficients, suppressing stall speeds and enabling safer overall flight operations.

One implementation of the device disclosed and claimed herein is shaped so as to produce streamwise vortices when attached to an internal or external surface of an aircraft and exposed to airflow of a flowfield. The implementation can include a vortex generator having an upstream end and a distal downstream end with respect to a direction of a flowfield. The vortex generator can have a lateral width and a vertical height and a bottom surface mountable to a surface of an aircraft skin. The vertical height of the vortex generator can be tapered to increase from the upstream end to the distal downstream end forming a concave upper surface and the lateral width of the vortex generator can be tapered to decrease from the upstream end to the distal downstream end forming concave sidewalls.

The bottom surface can be mounted flush to the surface of the aircraft skin. The vortex generator can be constructed of a material sufficiently flexible to mount flush on a non-uniform aircraft skin and to deform responsive to increased pressure from the flowfield to thereby reduce said vortex generators vertical height from an initial height to a reduced height. The flexibility of the material can be such that the vertical height reduces as a dynamic pressure of the flowfield increases. In order to achieve such reduction in height, the device can be constructed of material sufficiently flexible to possesses a yield strain of greater than 0.5%.

The device can be flexible enough to conform to one of a raised surface raised above and a recessed surface recessed below the surface of the aircraft skin. The device can attach to any class of surface of the aircraft skin including skins of wings, fuselages, control surfaces, ailerons, rudders, flaps, bay doors and windows. The device can attached to any class of internal surfaces of the aircraft skin including engine nacelles, engine nozzles, avionics bay inlets, interior windshields, bays, auxiliary power units or dumps or exhaust ports.

The device can be constructed of a material having an averaged electrical resistivity of greater than approximately $1 \times 10^{-8}$ Ω-m, but less than approximately $1 \times 10^{10}$ Ω-m. The device can also be constructed of a flexible bulk radar-absorbent material. The device can further be attached to the surface of the aircraft skin with radar-absorbing adhesive. It can also be constructed of layers of one of radar absorbent and radar-reflective material which form internal Jaumann absorbers and/or having an internal structure comprising radar absorbing and radar reflecting microstructures forming radio frequency wedge traps.

The concave upper surface of the device can be one of smooth or corrugated and the sidewalls can be one of smooth and corrugated. The bottom surface can be one of concave, flat and hollow, thereby allowing for attachment to the surface of the aircraft skin and accommodating of structural details which lie on the aircraft skin. The device can also be constructed with a surface which inherently rejects adherence of atmospheric foulants one or more of rain, dust, sand, debris, snow and ice.

One implementation of the device can be miniaturized having a maximum dimension of approximately 1 μm or less, or enlarged having a dimension as large as the largest wing chord of a widebody aircraft. The device can be integrally fabricated into one or more of a group of flexible or rigid materials adapted for installing as a planar surface of an aircraft structure selected from sheets, mesh, and films. The device can be fabricated in one or more of a plurality of regular and irregular patterns, one or more of a plurality of stream-wise and crossflow-wise orientations and one or more of a plurality of sizes for placement on one or more of a plurality of internal and external aircraft surfaces.

Various implementations of the device can be fabricated in one or more of a plurality of regular and irregular patterns, one or more of a plurality of stream-wise and crossflow-wise orientations and one or more of a plurality of sizes for placement on one or more of a plurality of internal and external aircraft surfaces, where said device is integrally fabricated into mounting sheet. The device can be fabricated in one or more of a plurality of regular and irregular patterns, one or more of a plurality of stream-wise and crossflow-wise orientations and one or more of a plurality of sizes for placement on one or more of a plurality of internal and external aircraft surfaces, where said device is temporarily mounted to a nonstructural sheet of material which used only for installation and alignment.

Yet another implementation of the device can have one or more sensors selected from a group of sensors including temperature, position, icing condition, pressure and radio frequency sensors. The device can be constructed of a RADAR absorbing material and internally structurally arranged such that an outermost surface is semi dielectric and an internal portion is constructed of semi conducive material.

Yet another implementation of the device is a flexible vortex generator conformable to one or more of internal or external surfaces of an aircraft structure and having a curvature and where said flexible vortex generator is constructed of a RADAR absorbing material, and where said flexible vortex generator is internally structurally arranged such that the outermost surface is semi dielectric and the internal portion is constructed of semi conducive material.

BRIEF DESCRIPTION OF THE DRAWINGS

FIG. 4 is taught in prior art and shows the typical configuration of recessed ramp vortex generators.

FIG. 5 is taught in prior art and shows the configuration of a typical retroreflector.

FIG. 6 shows the fundamentals of how a conventional retroreflector returns radar echoes to the source regardless of angle between 0 and 90° angles of regard.

FIG. 7 shows a single RAD-LDVG bonded to an aircraft surface, exposed to low dynamic pressure airflow.

FIG. 8 shows a single RAD-LDVG bonded to an aircraft surface, exposed to higher dynamic pressure airflow.

FIG. 9 shows a row of RAD-LDVGs as they may be arranged in any direction and/or ganged together.

FIG. 10 shows a RAD-LDVG being held in an undeformed shape.

FIG. 11 shows a RAD-LDVG being twisted, thereby showing its tremendous flexibility.

FIG. 12 shows a sample RAD-LDVG integration scheme on a curvilinear surface.

FIG. 16 shows a comparison of well integrated and poorly integrated low observable aircraft design.

FIG. 17 shows a representative radio frequency incident wave striking a bare surface.

FIG. 18 shows how radio frequency energy is absorbed via a Jaumann absorber configuration as employed within the RAD-LDVGs.

DETAILED DESCRIPTION OF EXEMPLARY EMBODIMENTS

This application claims priority to and the benefit of U.S. Provisional Patent Application Ser. No. 61/747,888 entitled, RADAR ABSORBING DEFORMABLE LOW DRAG VORTEX GENERATOR, filed Dec. 31, 2012, which is incorporated by reference herein in its entirety.

Figure 1:
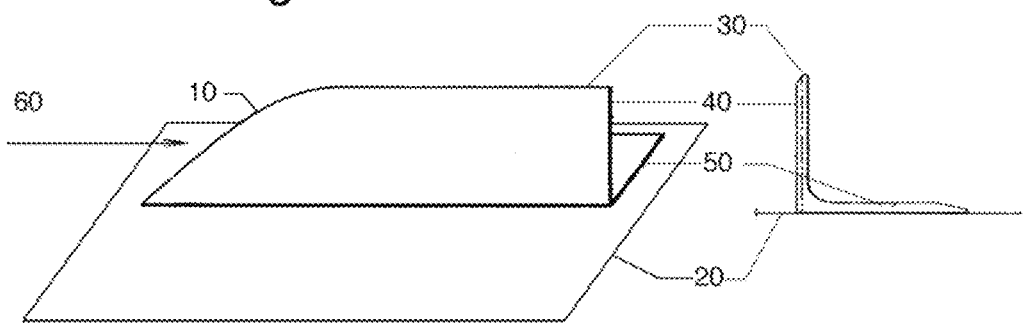
FIG. 1 is important prior art and shows a conventional vane vortex generator of the configuration used by many aircraft, from the time of the Bf 110 forward to today.

Starting with the Bf-110 Zerstörer of 1936, vortex generators of the configuration shown in FIG. 1 have been regularly used on a variety of aircraft for a variety of purposes. This conventional, rigid VG (10) has a vertical portion which is approximately normal to the aircraft surface (20) and either bonded, riveted or screwed in place. The upper edge (30) is set at a finite cant angle against the oncoming airflow and will peel a vortical structure as it separates at that edge. The vertical riser (40) is most often made from either aluminum or steel and integrated to a structural foot (50). The height of the rigid VG is typically set in accordance with its intended use and local boundary layer height. Clearly, prior art teaches that nearly all preceding VGs have surfaces which form right angles to the aircraft surface. Because no flexibility is taught, typical engineering materials can be assumed to be used in these applications (and is the case in practice). Accordingly, local strains to yield of these materials will be under 0.2%, which, in lay terms implies a rigid structure.

Figure 2:
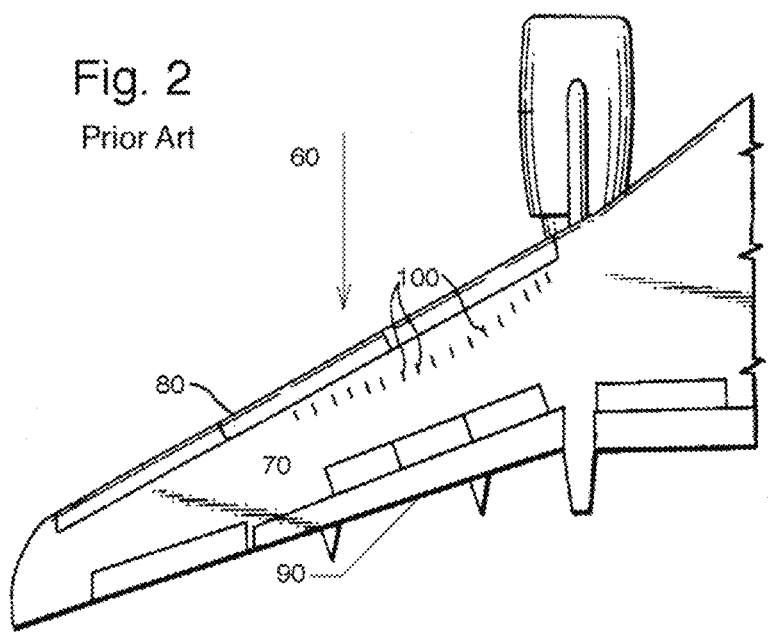
FIG. 2 is taken from prior art, showing a typical arrangement of vortex generators on an aircraft wing.

FIG. 2 shows a typical integration scheme for vortex generators on wing surfaces. The wing is exposed to air stemming from a freestream flowfield (60) which flows over the wing (70) from the leading edge (80) to the trailing edge (90). The multitude of VGs (100) then are used to reattach otherwise separated and/or turbulent flow depending on the flight condition and VG location.

Figure 3:
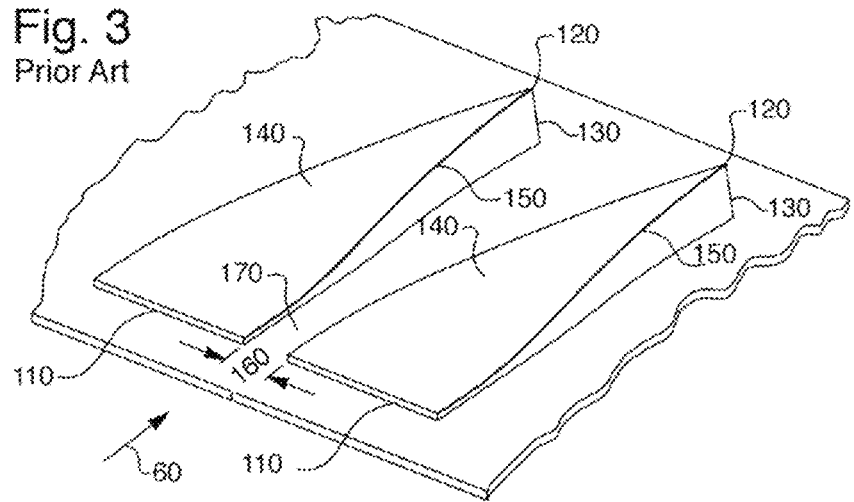
FIG. 3 is taught in prior art and shows the overall configuration of ramp-type vortex generators.

FIG. 3 introduces the rigid ramp configuration of VG. As the oncoming airflow (60) goes over the aerodynamic surface, it first encounters the leading edge of the VG (110), then heads towards the apex (120), with a small amount of airflow being lifted to the height of the apex peak (130). The central body of the VG (140) causes the flow to spill over the VG edges (150), which then rolls up into vortices. The spacing of the VG (150) is important as different aerodynamic properties can be induced by its optimization. The upstream height of the VG (170) is important as it allows for structural attachment and is typically set so as to be buried deep within the local boundary layer.

FIG. 4 shows how the ramp VG of FIG. 3 can be inverted and turned into a recessed cavity VG. As the airflow (60) moves towards the apex of the cavity (180), it will flow over the upper surface (190). As with the individual exposed ramp rigid VG of FIG. 3, the flow moves towards the terminal edge of the structure (200) and the local wedge apexes and its downstream sides (210, 220, 230). The lower ramp floor (240) accommodates both left hand and right hand vortical structures (250, 260). Because the recessed sidewalls, (210, 220) form strong right angles to the lower ramp floor (240), they act as retroreflectors in the same way as the conventional VG of FIG. 3.

FIG. 5 shows a conventional retroreflector (or corner reflector) for reference. This type of structure has been taught for nearly 100 years and has been shown to be very effective at returning radar energy of given spectra. Clearly, the retroreflector of FIG. 5 not only looks very much like the VG of FIG. 1, but it also functions in an almost identical way electromagnetically because the shapes are so similar.

FIG. 6 shows how a retroreflector functions. The two sidewalls of the retroreflector (270, 280), are set at approximately 90° to each other. As a given emitter (290) sends radio frequency (RF) wave energy (300), it follows a given vector (310). Because most RF surfaces exhibit the principle that the angle of incidence is equal to the angle of reflection in certain RF bands, the reflected waves (320) bounce from the first surface (280) and reflect off the second surface (270) right to the threat emitter along the return vector (330). As a result, it is taught that, a retroreflector is an excellent device for allowing an airborne vehicle to be tracked. Of course, if RF stealth properties are desired, then retroreflectors can severely harm aircraft RCS.

FIG. 7 shows a single RAD-LDVG mounted to the skin of an aircraft, exposed to a low speed, low dynamic pressure flowfield (60). As the boundary layer is forced past the leading edge of the RAD-LDVG (110), it moves towards the apex (120) with a small amount of flow being elevated to the apex height (130). The VG ramp (140) causes the airflow to spill over the edges, forming left and right-hand vortical structures (250, 260), which then move further downstream over the surface (340).

FIG. 8 shows the same RAD-LDVG as in FIG. 7, but with faster airflow (61) or increased dynamic pressure. The RAD-LDVG can have an upstream end (leading end) with respect to the direction of airflow of the flowfield and a distal downstream end. One implementation of the device disclosed and claimed herein is shaped so as to produce streamwise vortices when attached to an internal or external surface of an aircraft and exposed to airflow of a flowfield. The implementation can include a vortex generator having an upstream end and a distal downstream end with respect to a direction of a flowfield. The vortex generator can have a lateral width and a vertical height and a bottom surface mountable to a surface of an aircraft skin. The vertical height of the vortex generator can be tapered to increase from the upstream end to the distal downstream end forming a concave upper surface and the lateral width of the vortex generator can be tapered to decrease from the upstream end to the distal downstream end forming concave sidewalls.

The bottom surface can be mounted flush to the surface of the aircraft skin. The vortex generator can be constructed of a material sufficiently flexible to mount flush on a non-uniform aircraft skin and to deform responsive to increased pressure from the flowfield to thereby reduce said vortex generators vertical height from an initial height to a reduced height. The flexibility of the material can be such that the vertical height reduces as a dynamic pressure of the flowfield increases.

Because the RAD-LDVG is flexible and capable of strains far in excess of 0.2%, which is a typical yield strain for structural materials, the RAD-LDVG apex height (131) is seen as being substantially reduced. Because the RAD-LDVG ramp (140) is blown "down," or to be closer to the surface (340), the strengths of the trailing vortices (251, 261) are also reduced. This is a highly beneficial effect as the vortex filament strength is directly related to the amount of element drag which is generated by the VG. Although the RAD-LDVG can possess the form factor of a ramp VG in the undeformed condition, it can also be fabricated in a vane, bump, reverse-wedge, wishbone, asymmetric tetrahedral wedge or any of a variety of other form factors which generate streamwise vortices.

FIG. 9 shows how the RAD-LDVGs can be arranged in a linear fashion, end-to-end (upstream end-to-distal downstream end). The can also overlap the downstream end over the upstream end-end-to-end. It is clear to see that RAD-LDVG's (140, 141, 142 ... 147) can have any number and are independent of scale. The amount of overlap is also immaterial. Similarly, lateral spacing and number (not shown) is infinitely variable as well.

FIG. 10 shows a doublet RAD-LDVG (370) held between two hands (350, 360) in an undeformed condition. FIG. 11 shows the same doublet RAD-LDVG being twisted between the hands (351, 352) with minimal effort, demonstrating the high flexibility of the device (371). This high level of flexibility can be imparted to VG's of all configuration, not just wedge-ramp. Accordingly, all geometries of VGs can be considered to be RAD-LDVG's if constructed properly. FIG. 11 simply shows the form of RAD-LDVG which possesses the lowest drag increments and allows for high levels of surface conformity. This high level of surface conformity is displayed in FIG. 12 as the RAD-LDVGs are integrated on a curved surface (341). Because the RAD-LDVGs are so flexible, they can essentially take an infinite number of shapes as they conform to the underlying structures. This flexibility is critical in the operation and utility of the RAD-LDVGs. In addition to allowing for easy installation, the ability to conform to an underlying structure allows the RAD-LDVGs to shed ice and atmospheric foulants quite readily as the strains to failure of ice is orders of magnitude below the high strain levels which RAD-LDVGs are capable of. If ice begins to accumulate on the RAD-LDVG (371), it will rapidly loosen as the underlying structure of the RAD-LDVG will be much more compliant than ice. This mismatch in compliance and strain to structural failure leads to rapid and inherent ice shedding properties which indicates that accumulated ice will simply be blown downstream (372).

Figure 13:
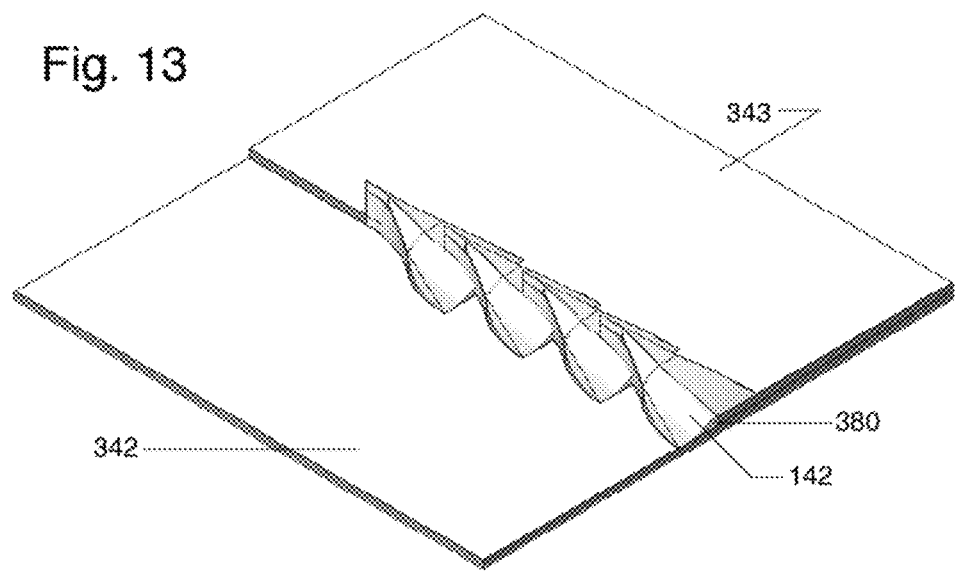
FIG. 13 shows a sample RAD-LDVG integration scheme on a lap joint.

In addition to possessing superior ice shedding properties because of high levels of structural compliance, the RAD-LDVGs can also span many other forms of surface features or "details." These details can take the form of all sorts of structural joints, hinges, gaps, and even underlying structural material changes. FIG. 13 shows a simple lap joint formed from the union of an underlying structural sheet (342) and an overlapping sheet (343). These kinds of details are very common in aerospace structures and generally present some minimal form of surface imperfection increment in flow instability. The real harm to the performance of many military aircraft comes in that the detail will spike the detail-induced RCS increment. Accordingly, a row of RAD-LDVGs laid over the lap itself will reduce the RCS increment by many orders of magnitude. Because of their ability to conform to the underlying structure, the deformed RAD-LDVGs (142) take on a whole new shape which is different than the cast form factor, but no less effective as it will possess vortex shedding features. If one uses radar-absorbing material in the bonding agent (380), then the overall effectiveness of the RAD-LDVG in the RF spectrum will be further enhanced.

Figure 14:
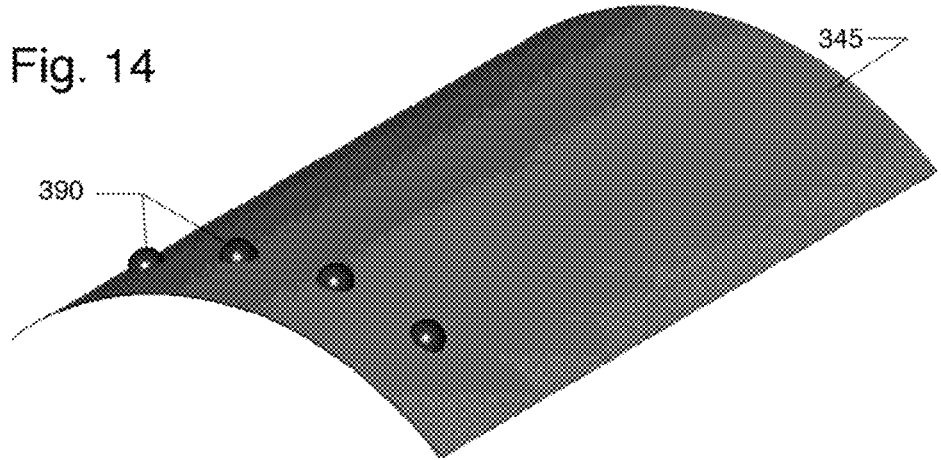
FIG. 14 shows a curvilinear surface with exposed structural details.

Another form of detail which is extremely common on aircraft is the appearance of fastener ends. Among the most ubiquitous fastener types are rivets as shown in FIG. 14. Each rivet protrudes from the surface and presents its own RCS increment. Among the various classes or rivets, button-head rivets (390) protrude farthest into the airflow beyond the outer mold line of the surface (345) and induce the highest level of disturbance both aerodynamic disturbance and detail-induced RCS increment.

Figure 15:
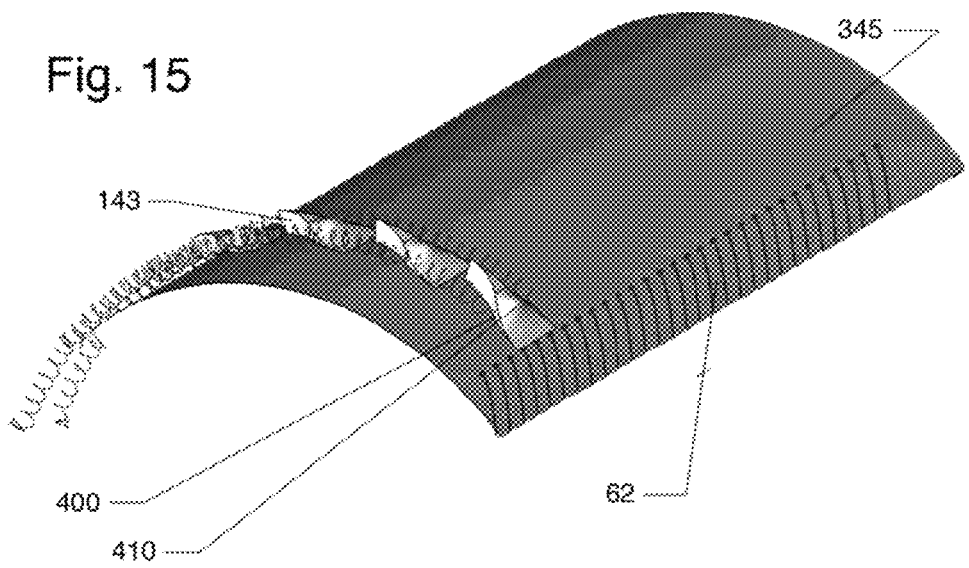
FIG. 15 shows how the RAD-LDVGs can be laid directly over the structural details and still function properly aerodynamically.

The flexibility of RAD-LDVGs allows them to be bonded right over the rivet heads as shown in FIG. 15. The deformed RAD-LDVG (143) is bonded by a layer of flexible Radar-Absorbing Material (RAM) adhesive (400) and exhibits a bump (410) which is induced by the underlying rivet head itself. Because the internal structure of the RAD-LDVG has extremely low modulus material or a hollow cavity, this allows the device to easily wrap around protruding objects like rivet heads. As a result, any structural detail present on the outside of aircraft may be accommodated by mounting the RAD-LDVG over the object in a conformal fashion.

If care is taken in the arrangement of RAD-LDVG installation, then the schematic of the difference in aircraft RCS can be seen in FIG. 16. The two sub-figures show the overall RCS contributions of the overall airframe and those induced by the airframe details. In a poorly integrated design (which is the most common type of aircraft), the details will produce a variety of RCS spikes. When combined with the airframe RCS, the net RCS, which is a vector quantity, can be increased dramatically. If care is taken to mitigate detail RCS contributions, then a "Well Integrated Design" will be seen. This type of design possesses only major contributions in RCS from the airframe as the detail RCS contributions stay well below threshold levels.

If the surface of a skin or structural detail like a rivet or screw head is examined in great detail, then the RF reflection properties of the surface can be seen pictorially in FIG. 17. The surface (450) readily reflects an incident RF wave (460) with minor scattering and/or refraction (500). The internal structure of the RAD-LDVG is specifically designed to trap RF waves. This is done by several mechanisms simultaneously. The first comes from the base material of the RAD-LDVG. This material will have an RF reflectivity less than isotropic metals like aluminum while possessing RF transmission impedance greater than dielectric materials like polycarbonate. The electrical resistivity of the bulk materials is related to these properties. Similarly, the bulk electrical conductivity is related to these properties. Accordingly, the RAD-LDVGs will necessarily be made from materials which will have a bulk electrical resistivity (that is, not the electrical resistivity of the individual constituents, but of the entire composite material) of more than that of a typical isotropic metal, $1\times10^{-8}$ $\Omega$-m, but less than that of a dielectric material like structural glass $1\times10^{10}$ $\Omega$-m. With a mid-range dielectric, a Jaumann absorber can be configured within the RAD-LDVG as shown in FIG. 18. As an incident RF wave (460) strikes the outer most semi-dielectric surface (470), some of the energy will be transmitted within the bulk semi-conductive material (often RAM) (480). A small amount of the energy is reflected off the surface (490). The subsequent reflections within the Jaumann absorber off the basic substructure (450), continue to reflect over and over again (510, 530, 550). With each reflection, a small amount of RF energy is then rejected (490, 501, 520, 540). Many of these rejected waves are often out of phase which leads them to either partially or mostly cancel each other depending on illuminating wavelength and depth of the Jaumann absorber. The internal structure of the RAD-LDVG can be layered to form one, two or several Jaumann absorbers, each with alternating layers of more or less radar reflective and absorptive properties. Because the RAD-LDVG can be shaped like a wedge, a wide spectrum of RF frequencies can be accommodated as the thickness of the layers will vary through the distance from one end to the other, leading to a broadband RF absorber.

The RAD-LDVG simultaneously solves these two problems by employing flexible radar energy absorbing materials and specialized radar energy absorbing internal structural arrangements. Because the RAD-LDVGs are flexible, they may conform to the aircraft surface be it flat or imperfect, over features like joints, screw and/or rivet heads. As the RAD-LDVGs are installed over surface details or excrescences, they mask the radar cross-section increments induced by the details. This masking property reduces the overall radar cross-section of the entire aircraft. The flexibility of the RAD-LDVGs allow for easier installation by methods such as surface bonding than conventional vortex generators as they can be shaped to the surface curvature during installation. This ability to curve and deform accordingly reduces or eliminates the need for specialized machining, adapter rails or adapter blocks. Because the RAD-LDVG is flexible, it will inherently shrink in height as it is exposed to increased dynamic pressure from oncoming airflow at greater flight speeds. The height reduction will accordingly reduce cruise drag increments produced by the RAD-LDVGs. Conversely, the RAD-LDVGs will inherently grow in height during low dynamic pressure flight phases, which will, in turn, increase vortex generator effectiveness. Because takeoff and landing flight phases are performed at comparatively low dynamic pressures, the RAD-LDVGs will become more effective and produce greater levels of flow attachment, thereby increasing maximum lift coefficients, suppressing stall speeds and enabling safer overall flight operations.

Figure 19:
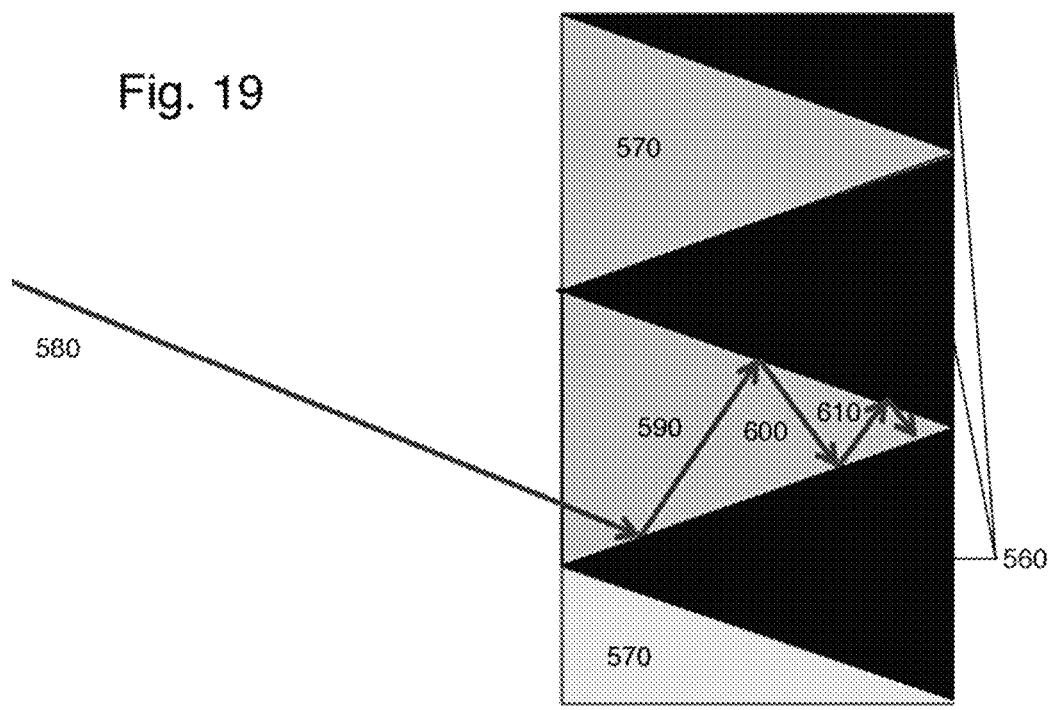
FIG. 19 shows how an incident RF wave can be trapped by a wedge trap configuration like the RAD-LDVGs.

Because the thicknesses of the RAD-LDVG can vary in two orthogonal directions, a second form of RF energy capture can be shown in FIG. 19. The RAD-LDVGs employ a Wedge-Trap configuration of RF absorber. As an incident RF wave (580) enters the outer layer of the RAD-LDVG, it will reflect off a more reflective underlying layer of material (560). Because the structure is angled, the RF wave will then proceed through the more absorptive RAM layer (570) in the form of ever-more reflected waves (590, 600, 610, etc.). With each reflection, more and more energy is invested in the RAM layer till it is essentially all consumed. The RAD-LDVG can be composed of monolithic RAM, Jaumann absorbers layered in mostly horizontal or vertical directions and/or wedge traps in the same or orthogonal directions.

What is claimed is:

1. A device which is shaped so as to produce streamwise vortices when attached to an internal or external surface of an aircraft and exposed to airflow, comprising:
a vortex generator having an upstream end and a distal downstream end with respect to a flowfield, where the vortex generator has a lateral width and a vertical height and a bottom surface mountable to a surface of an aircraft skin where the vertical height of the vortex generator is tapered to increase from the upstream end to the distal downstream end forming a concave upper surface, the concave upper surface having an apex peak at the distal downstream end, and where the lateral width of the vortex generator is tapered to decrease from the upstream end to the distal downstream end forming concave sidewalls;
said bottom surface mounted flush to the surface of the aircraft skin; and
said vortex generator constructed of a material sufficiently flexible to mount flush on a nonuniform aircraft skin and to deform responsive to increased pressure from the flowfield to thereby reduce said vortex generators vertical height at the apex peak from an initial height to a reduced height.

2. The device of claim 1 where the flexibility of the material is such that the vertical height reduces as a dynamic pressure of the flowfield increases.

3. The device as recited in claim 1, constructed of material sufficiently flexible to possesses a yield strain of greater than 0.5%.

4. The device as recited in claim 3, conformed to one of a raised surface raised above and a recessed surface recessed below the surface of the aircraft skin.

5. The device of claim 1, attached to any class of surfaces of the aircraft skin, selected from a group of classes including skins of wings, fuselages, control surfaces, ailerons, rudders, flaps, bay doors and windows.

6. The device of claim 1, attached to any class of internal surfaces of the aircraft skin, selected from a group of classes including engine nacelles, engine nozzles, avionics bay inlets, interior windshields, bays, auxiliary power units or dumps or exhaust ports.

7. The device as recited in claim 1, constructed of a material having an averaged electrical resistivity of greater than approximately $1\times10^{-8}$ Ω-m, but less than approximately $1\times10^{10}$ Ω-m.

8. The device of claim 1, constructed of a flexible bulk radar-absorbent material.

9. The device of claim 8, attached to the surface of the aircraft skin with radar-absorbing adhesive.

10. The device of claim 1, constructed of layers of one of radar absorbent and radar-reflective material which form internal Jaumann absorbers.

11. The device of claim 1, having an internal structure comprising radar absorbing and radar reflecting microstructures forming radio frequency wedge traps.

12. The device of claim 1, where the concave upper surface is one of smooth and corrugated.

13. The device of claim 1, where the sidewalls is one of smooth and corrugated.

14. The device of claim 1, wherein the bottom surface is one of concave, flat and
hollow, thereby allowing for attachment to the surface of the aircraft skin and accommodating of structural details which lie on the aircraft skin.

15. The device of claim 1, constructed with a surface which rejects adherence of atmospheric foulants one or more of rain, dust, sand, debris, snow and ice.

16. The device of claim 1, having a maximum dimension of approximately 1 μm or less.

17. The device of claim 1, having a dimension as large as the largest wing chord of a widebody aircraft.

18. The device of claim 1, integrally fabricated into one or more of a group of flexible or rigid materials adapted for installing as a planar surface of an aircraft structure selected from sheets, mesh, and films.

19. The device of claim 1, fabricated in one or more of a plurality of regular and irregular patterns, one or more of a plurality of stream-wise and crossflow-wise orientations and one or more of a plurality of sizes for placement on one or more of a plurality of internal and external aircraft surfaces.

20. The device of claim 1, fabricated in one or more of a plurality of regular and irregular patterns, one or more of a plurality of stream-wise and crossflow-wise orientations and one or more of a plurality of sizes for placement on one or more of a plurality of internal and external aircraft surfaces, where said device is integrally fabricated into mounting sheet.

21. The device of claim 1, fabricated in one or more of a plurality of regular and irregular patterns, one or more of a plurality of stream-wise and crossflow-wise orientations and one or more of a plurality of sizes for placement on one or more of a plurality of internal and external aircraft surfaces, where said device is temporarily mounted to a nonstructural sheet of material which used only for installation and alignment.

22. The device of claim 1, fabricated in one of the form factors of the group of form factors comprising a ramp, a wedge, a wishbone and an asymmetric tetrahedral wedge each of which having a form factor that generates streamwise vortices.

23. The device of claim 1, having one or more sensors selected from a group of sensors including temperature, position, icing condition, pressure and radio frequency sensors.

24. The device of claim 1, where the device is constructed of a RADAR absorbing material and internally structurally arranged such that an outermost surface is semi dielectric and an internal portion is constructed of semi conducive material.

25. The device of claim 1, fabricated into one of a group of several form factors including a vane, a reverse wedge, a wishbone, an asymmetric tetrahedral wedge and any other form factor which generate a streamwise vortices.

26. The device of claim 1, further including a plurality of vortex generators arranged linearly upstream end to distal downstream end.

27. The device of claim 25, overlapping the distal downstream end over the upstream end.

28. An aircraft comprising:
one or more internal or external surfaces exposed to airflow, the surface having radar cross-section increasing features selected from the group of joints, screws or rivet heads;
at least one flexible vortex generator having a curvature and conformable to said one or more internal or external surfaces,
where said flexible vortex generator is constructed of a RADAR absorbing material,
where said flexible vortex generator has an outermost surface composed of dielectric material and an internal portion constructed of conducive material, and
wherein said flexible vortex generator is installed over said radar cross-section increasing features to reduce the overall radar cross-section of the entire aircraft.

* * * * *